United States Patent
Koeppen et al.

(10) Patent No.: US 6,636,614 B1
(45) Date of Patent: Oct. 21, 2003

(54) METHOD FOR PREVENTING THE FALSIFICATION OF DOCUMENTS COMPRISING A PHOTOGRAPH, PREFERABLY A FACIAL-VIEW PHOTOGRAPH

(75) Inventors: Mario Koeppen, Berlin (DE); Wolfgang Adam, Berlin (DE); Bertram Nickolay, Berlin (DE)

(73) Assignee: Fraunhofer-Gesellschaft zur Forderung der angewandten Forschung e.V., Munich (DE)

(*) Notice: Subject to any disclaimer, the term of this patent is extended or adjusted under 35 U.S.C. 154(b) by 0 days.

(21) Appl. No.: 09/423,355
(22) PCT Filed: Mar. 24, 1999
(86) PCT No.: PCT/DE99/00880
§ 371 (c)(1), (2), (4) Date: Feb. 14, 2000
(87) PCT Pub. No.: WO99/49420
PCT Pub. Date: Sep. 30, 1999

(30) Foreign Application Priority Data

Mar. 24, 1998 (DE) .......................... 198 12 826

(51) Int. Cl.[7] ................................. G06K 9/00
(52) U.S. Cl. ................ 382/100; 382/237; 283/73; 283/74
(58) Field of Search .................. 382/100, 237; 283/73, 74

(56) References Cited

U.S. PATENT DOCUMENTS 6,049,627 A * 4/2000 Becker et al. ............ 382/181
6,094,722 A * 7/2000 Astola et al. ............. 713/176
6,341,350 B1 * 1/2002 Miyahara et al. ........ 713/176
6,345,104 B1 * 2/2002 Rhoads .................... 382/100

OTHER PUBLICATIONS

"Robust Data Hiding for Images" by Swanson et al., pp. 37–40, Digital Signal Processing Workshop Proceedings, Sep. 1996., IEEE.*

* cited by examiner

Primary Examiner—Jon Chang
Assistant Examiner—Charles Kim
(74) Attorney, Agent, or Firm—Antonelli, Terry, Stout & Kraus, LLP

(57) ABSTRACT

Disclosed is a method for counterfeit-proof of documents bearing a picture. The picture is transferred into a digital image file or present as a digital image file into which a binary form secret image present is incorporated. The digital image file is divided into cells of a number equaling a number of pixels of the secret image. A parameter function allocates a binary output value to each cell on the basis of parameter values, which describe each image point, in such a manner that the bivalent output value of all the cells yields a bivalent position matrix, by the parameter values of the image points of the individual cells being modified with the aid of an optimizing process in such a manner that, first, the changes made to the image file of the picture of the document result in no visually perceivable changes and, second, the result of applying the parameter function to the individual cells yields a bivalent position matrix which corresponds to the binary values of the secret image.

20 Claims, 5 Drawing Sheets

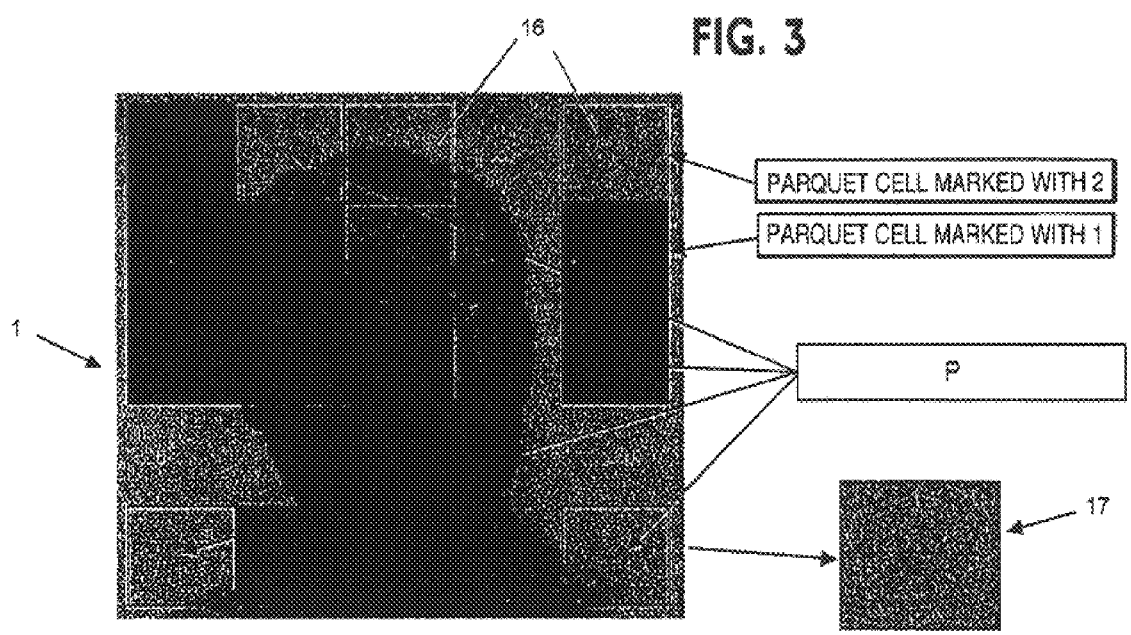

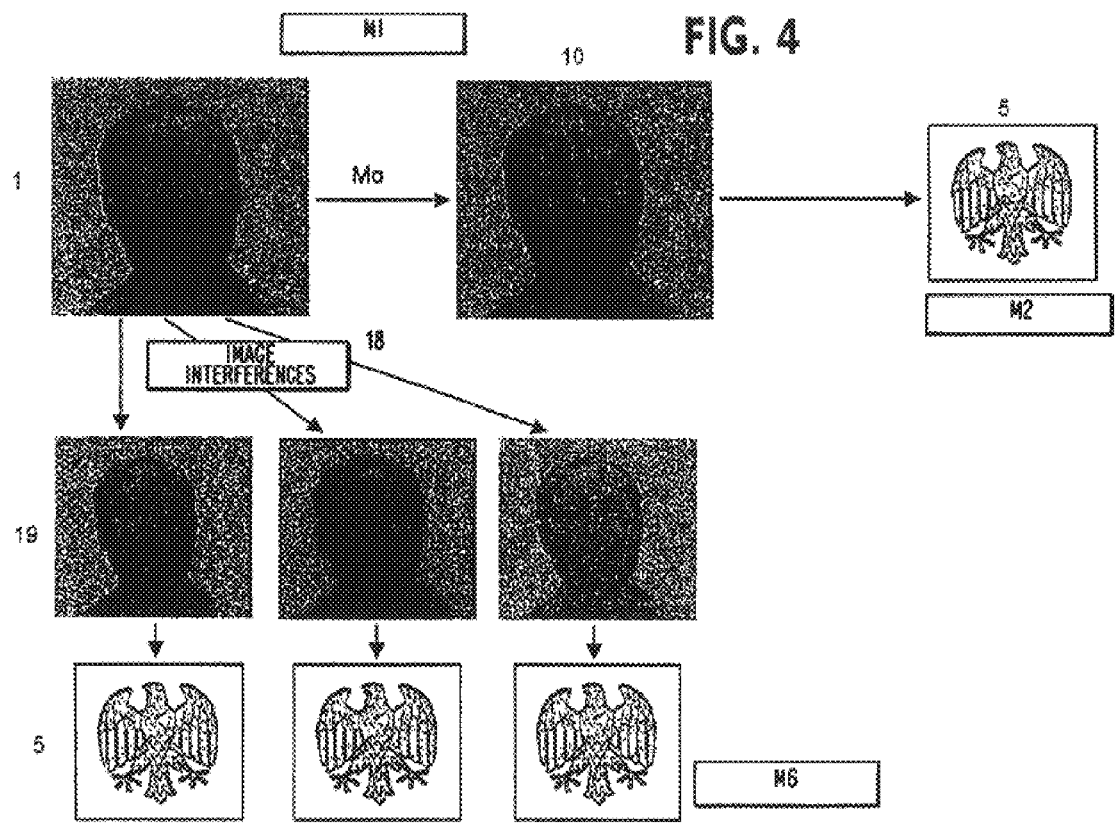

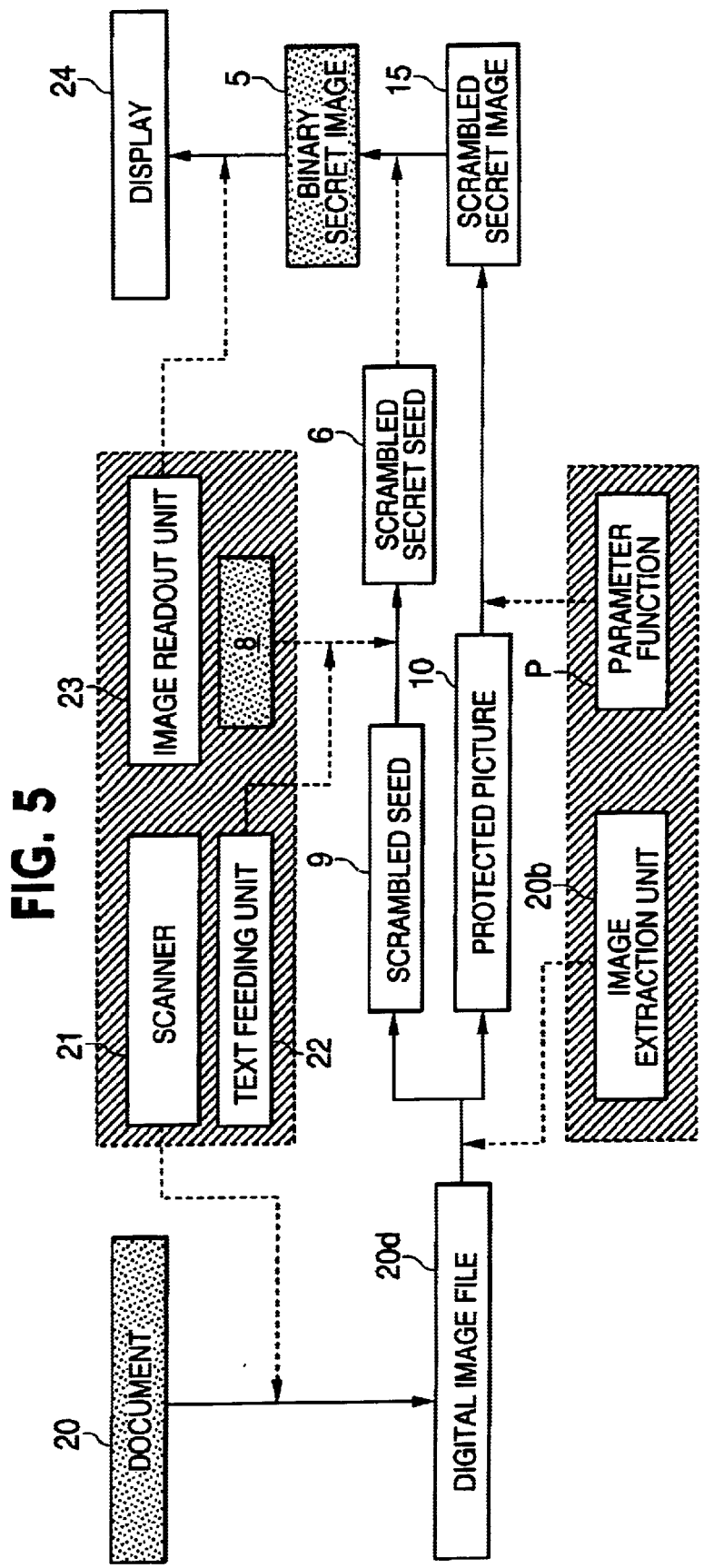

METHOD FOR PREVENTING THE FALSIFICATION OF DOCUMENTS COMPRISING A PHOTOGRAPH, PREFERABLY A FACIAL-VIEW PHOTOGRAPH

TECHNICAL FIELD

The present invention relates to a method for counterfeit-proof of documents bearing a picture, preferably a passport picture.

STATE OF THE ART

The authenticity of documents used as printed work, for instance any sort of identity card verifying the own identity and/or proof of certain personal skills or authorization, is of particular official, economical and public interest especially as circulation of falsifications can lead to undreamed of loss of security as well as material loss.

When attaching or printing passport pictures onto official documents for authentication, it must be ensured that falsification is rendered impossible. Particularly, with the globalization of authorization sectors, greater attention must be paid to the authenticity of documents.

The current guarantees for protection against falsification by certification by the document issuer as well as by marking the to-be-protected document are still inadequate.

Although major efforts are being made to increase protection against falsification, with today's technology, for example copying technology, it is easier to duplicate printed documents and circulate them as deceptively similar copies or forgeries.

Annually, falsification of documents bearing attached or printed on passport pictures cause great losses, e.g. to the German economy.

The main problem is due to that although the process of attaching or printing on a passport picture is falsification-proof, the authenticity of the passport picture itself can no longer be a unequivocally checked. Thus, the presumed to be safe process can be undermined by substituting a false passport picture. The use of digitized passport pictures increases the problem considerably.

The British publication GB 2 172 850 describes a process for increasing the protection against falsification of signatures by using two basic linear patterns of which at least one is provided with a superimposed grainy or scrambled pattern, which usually bears the signature data. When regarding only the pattern containing the signature, it is impossible to recognize the signature. With the aid of this process, the signature cannot be easily deciphered. The signature data is not optically filtered out of the grainy basic pattern and made visible until both patterns are superimposed. With the aid of this process, the signature cannot be easily deciphered. To do so requires the corresponding counter pattern. However, frequently, it is desired that the signature, whose duplication should be made difficult if not impossible, is quickly visible for control. Use of this known process would render, for instance, a passport picture completely unrecognizable, which is impractical for daily use.

DESCRIPTION OF THE INVENTION

The present invention provides a method for counterfeit-proofing documents bearing a picture, preferably a passport picture, by means of which the authenticity of a printed picture can be verified. The method marks the picture in such a manner that the marking does not impair the overall visual impression of the picture and also is largely resistant to environmental influences (scratches, stains, etc.) on the printed out picture.

The present invention relates to a method for counterfeit-proofing documents bearing a picture, preferably a passport picture, and provides the following steps:

Transferring the picture into a digital image file or having the picture as a digital image file, into which a secret image in binary form is incorporated in such a manner that the digital image file of the picture is divided into parquet cells whose number equals the number of image points of the secret image.

Forming a parameter function which allocates a bivalent output value to each parquet cell on the basis of parameter values, which describe each the image point, in such a manner the bivalent output value of all the parquet cells yields a bivalent position matrix.

Modifying the parameter values of the image points of the individual parquet cells with the aid of an optimizing process in such a manner that, first, the changes made to the image file of the picture of the document result in no visually perceivable changes and, secondly, the result of applying the parameter function to the individual parquet cells yields a bivalent position matrix which corresponds to the binary values of the secret image.

Attaching the picture containing the data of the secret image to the document or printing the picture containing the data of the secret image out together with document.

The present invention described here is a method that protects the passport picture itself against falsification and manipulation. This protection continues even after the passport picture has been attached or printed onto the document. The key factor is the falsification-proofness of printed works such as pictures or other graphic patterns.

Two units, a protection providing unit and an inspection unit, are required to carry out the invented method. The protection providing unit is based on a digitized form of the to-be-protected printed work, respectively a passport picture, and provides in the passport picture a binary image of low resolution in a scrambled state, i.e. encoded state, as a secret image in such a manner that the quality of the passport picture itself is minimally influenced, i.e. not perceivable with the naked eye. The printed out passport picture containing the secret image is attached to the document or is printed out together with the document. The inspecting unit, e.g. in the form of a manual device, is subsequently used at any desired time to make the secret image on the genuine document visible again. If the secret image can be restored from the passport picture, the document is an original. If the document is a forgery, the secret image cannot be made visible.

In this manner, the authenticity of the document can be verified not only by the document itself but also by the attached or printed on passport picture.

In order to increase the degree of protection, the secret image integrated in the to-be-protected passport picture can be provided with an additional password so that it is impossible to readout the secret image from the passport picture without giving the password. The public part of the password can be provided in a suited manner on the to-be-protected document respectively in the form of a bar code. The owner of the document with the passport picture has to know the private part for authentication.

BRIEF DESCRIPTION OF THE DRAWINGS

The present invention is made more apparent in the following, by way of example, without the intention of limiting the scope or spirit of the overall inventive idea using preferred embodiments with reference to the drawing.

FIG. 3 is a representation of the allocation between parameter function and parquet cell;

FIG. 4 is a representation of the measuring functions; and

FIG. 5 is a representation of the manner of operation of the inspection unit.

WAYS TO CARRY OUT THE PRESENT INVENTION

Figure 1:
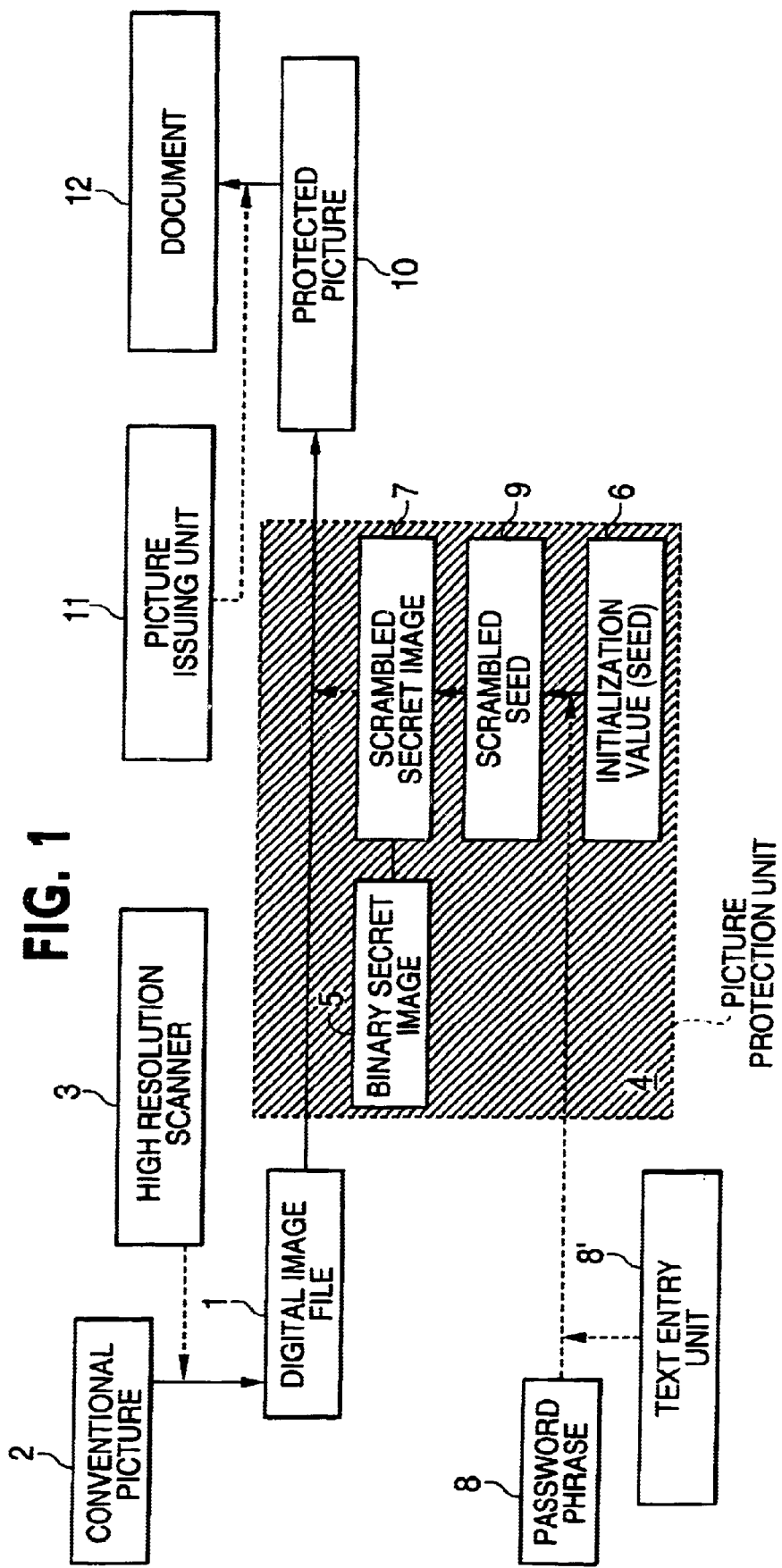
FIG. 1 is a diagrammatic view of the protection unit.

FIG. 1 shows a block diagram of the process of encoding a passport picture.

The to-be-protected passport picture is present in high resolution in a digital image file 1. Either the passport picture 1 has already been prepared with the aid of a digital photography technique or a conventional passport picture 2 on paper has been converted into digital form 1 by means of a high resolution scanner 3.

In a unit 4 providing the protection on passport picture 1, the passport picture is combined with the information of a binary secret image 5. Either the picture data of secret image 5 is incorporated directly into passport picture 1 or secret image 5 is encoded beforehand so that an encoded and scrambled secret image 6 can be incorporated into passport picture 1.

For encoding the binary image file of secret image 5, which has lower resolution (i.e. the number of pixels) than digital passport picture 1, the resolution and the depth of color of secret image 5 is less than that of the to-be-protected passport picture 1 (usually passport pictures have a resolution of 300 dpi with approximately 300×400 pixels and a color depth of 24 bits, whereas the secret image has a resolution of 30 dpi, with approximately 30×30 pixels and a color depth of 1 bit). The picture positions are fixed in the secret image 5 by means of a sequence of pseudo-random numbers generated by a pseudo-random number generator according to the provision of an initialization "seed" value. The picture parameters are exchanged in pairs at the picture positions to encode and scramble the secret image. A scrambled and encoded secret image 7 is produced.

In this way, the secret image 5, which is hidden in passport picture 1, can only be restored if the sequence of pseudo-random numbers is regenerated by the same seed and all exchanges in the encoded secret image 5 are reversed again. Optionally, seed 6 can also be scrambled by the document owner by means of a public-private key technology using a password phrase 8, which can be fed to the system via a text entry unit 8'. The scrambled and encoded seed 9 serves then as a key for restoration of the secret image and must be known to an inspection unit, which is described below.

As to be described in detail further on, the digital image file of passport picture 1 and of the scrambled secret picture 7 are mixed in such a manner that a protected passport picture 10 contains the information of the encoded secret image 7. The protected passport picture 10 can subsequently be printed onto or generally attached to a document 12 by means of a picture-issuing unit 11.

At this point, it must be noted that the encoding of the secret image can be optional. The invention primarily integrates the picture information of a secret image into a to-be-protected passport picture or something similar.

Figure 2:
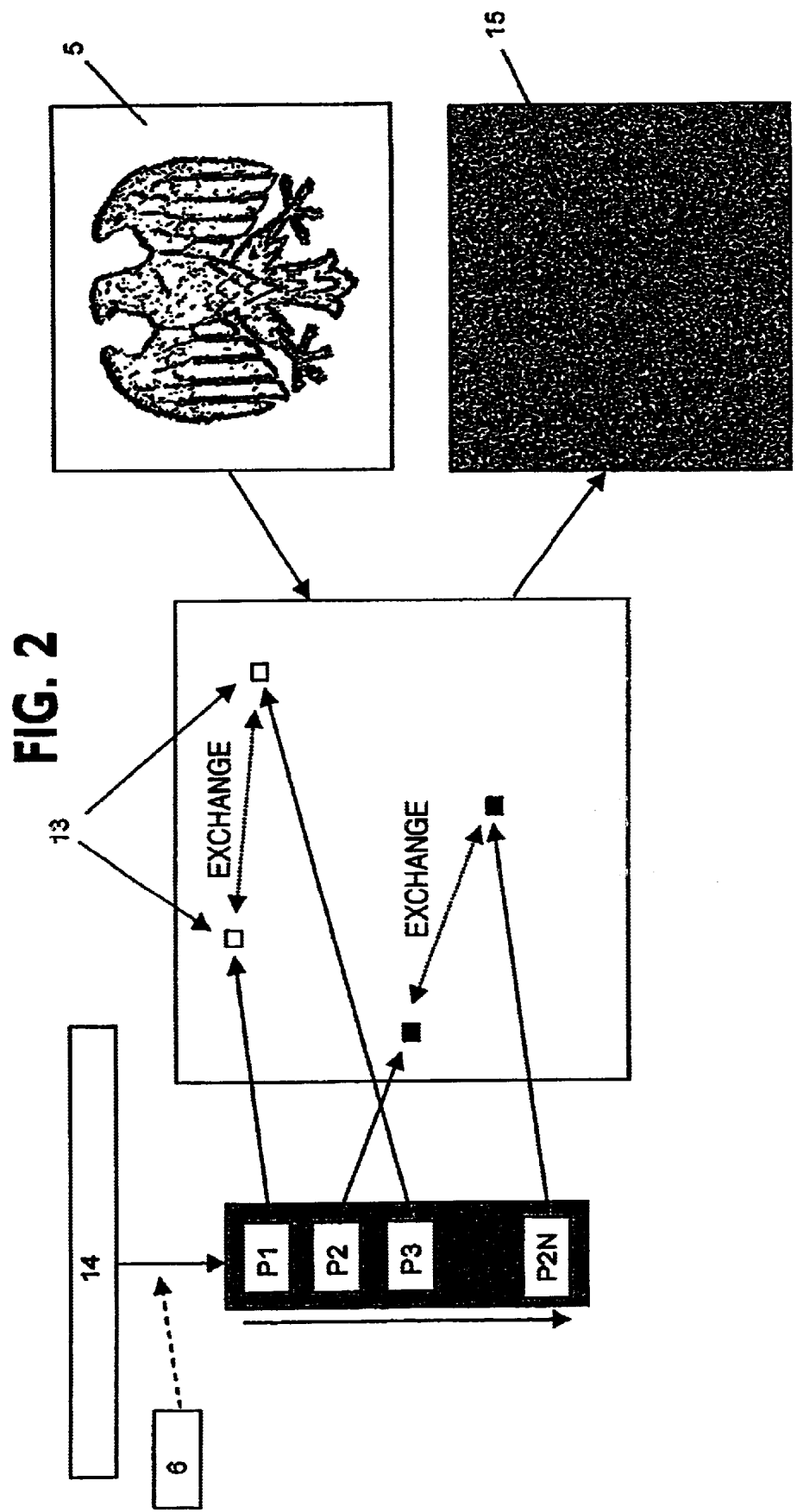
FIG. 2 is a representation for encoding or scrambling the secret image.

Before the integration method with which the secret image is incorporated into the to-be-protected picture is dealt with in detail, encoding of the secret image will be first briefly explained with reference to FIG. 2.

For example, the image of a Federal German eagle can be employed as secret image 5. The Federal German eagle 5 is a pattern contained, for example, in a square field comprising a multiplicity of single image pixels. In order to encode the secret image 5, 2N pseudo-random numbers P1, . . . P2N defining the position of the image pixels 13, whose picture parameters are exchanged and inverted, are generated by means of a pseudo-random generator 14 based on an initialization value (seed) 6. A scrambled secret image 15 is yielded that can only be restored by using the seed 6. As already previously mentioned, the seed can be additionally encoded using a password phrase.

FIG. 3 describes how the information contained in the secret image is integrated into the to-be-protected passport picture.

First, the surface of passport picture 1 is divided uniformly into rectangular sectionswhich are referred to as parquet cells. It is essential that the number of parquet cells 16 is identical to the number of single image pixels of the secret image. Each single parquet cell 16 of passport picture 1 again comprises a multiplicity of single image pixels with different color, gray, brightness or intensity values respectively, which generally are referred to as parameter values. Based on a so-called parameter function P, each single parquet cell is allocated a binary output value of either, for example 0 or 1. An example of such a parameter function is the calculation of whether the frequency of occurrence, with which a group of image pixels within a parquet cell is surrounded by image pixels within a same parquet cell with a greater saturation value than their individual parameter values, exceeds or does not exceed a certain limit value. If the calculation value exceeds, the parquet cell is allocated the binary output value 1. If the limit value is not reached, the parquet cell is allocated the binary output value 0. After applying the parameter function to all the parquet cells 16, a bivalent position matrix is yieldedwith each point in the matrix containing a one or a zero. The position matrix can also be considered a binary image with less resolution than the passport picture. FIG. 3 shows the bivalent position matrix with squares, which are entered in the passport picture 1 and are black or not black parquet cell areas. Thus, for example, the black filled parquet cells are given the bivalent output value 1 by the parameter function whereas the parquet cells that are not filled black are given the output value 0. Application of the parameter function to all the parquet cells 16 contained in passport picture 1 yields a binary position matrix which can also be considered a binary image and comprises the parquet cells valued 0 or 1. Such a binary image is shown in FIG. 3 as binary image 17.

The invention modifies binary image 17 in such a manner that it corresponds exactly to secret image 15 (perhaps scrambled). In order to do this, it is necessary to modify the content of each single parquet cell 16, i.e. the parameter values of the image pixels in each single parquet cell, in such a manner that after application of the parameter function to the modified parquet cell, a binary output value is obtained which is identical to the binary value from the scrambled secret image 15 at the corresponding position within the picture.

Modification of the image pixels of each parquet cell occurs with the aid of an optimization process, for example using generic algorithms which modify the parameters of the passport picture in such a manner that first, modification per parquet cell does not visibly influence the visual quality of the overall passport picture, secondly, the result of the application of the parameter function yields a binary image that corresponds exactly to the given and scrambled secret image and thirdly, minor interferences of the passport picture do not alter the modified passport picture following modification. This contributes especially to robustness of the protected passport picture to later modification by environmental influences to the printed out picture.

So-called measurement functions, which are explained in more detail with reference to FIG. 4, are employed to assess the degree to which the aforementioned criteria have been fulfilled.

Initial picture 1 represents an image of digital passport picture 1 yielding a protected passport picture 12 resulting from the aforedescribed modification Mo while incorporating a scrambled secret image. By employing a suited reading step, secret image 5 can be restored from the protected passport picture 12. If protected passport picture 12 is modified by environmental influences, image interferences 18 can occur, resulting in poor picture quality. FIG. 4 shows three different pictures 19 with image interferences 18 and each containing secret image 5 as information.

Measurement function M1 determines the degree of modification of the visual quality of the picture, for example from the number and degree of modified parameter values of individual picture positions. Measurement function M1 assesses the similarity between modified picture 12 and initial picture 1. Measuring function M2 determines the perfect matching of binary image yielded by modifying the binary position matrix with the given, encoded secret image. Finally, measurement function M3 forms the random modification of the parameter values of a picture 19 due to environmental influences after the print out and tests the reproduction of the secret image under these circumstances as well. Measurement function M3 determines from this the degree of robustness of the modification according to a scale that is open-ended to the top. Measurement function M2 and measurement function M3 can also be combined for evaluation.

The optimization process now searches for modifications of the parameter values of the passport picture, for which measurement function M1 is a small as possible value, measurement function M2, is the value allocated for a perfect match and measurement function M3 is a great as possible value. Accepted, however, are only solutions that meet criteria 2 exactly.

The best overall modifications found by the optimization process are applied to the passport picture. The picture modified in this manner thus represents the output of the to-be-protected unit (perhaps in conjunction with the perhaps encoded seed).

FIG. 5 shows a flow chart for inspecting the authenticity of a document 20 bearing a protected passport picture. With the aid of such as known scanner unit 21 the image of document 20 is scanned and transferred into a digital image file 20d. An image extraction unit 20b selects the section of the document in which the protected passport picture is intended. Furthermore, if present, the information of the scrambled seed 9, contained on the protected document in the form of a bar code, is read. Using the password phrase 8, which is fed to the system by means of a text feeding unit 22 for decoding the scrambled seed 9, seed 6 which is used to restore the secret image 5 can be decoded. Parallel to this, the digitized passport picture 10 provided with the scrambled secret image is processed by employing the parameter function P in order to obtain the scrambled secret image 15. As already previously described, the original secret image 5 is constructed from the scrambled secret image 15 with the aid of the decoded seed 6 and is visually represented on an image-readout unit 23 such as for example on a LCD display, and is at available for visual comparison 24. Matching the known image verifies the authenticity of the passport picture with the document issuing authority.

List of Reference Numbers

1 Digitized passport picture
2 Passport picture as photograph
3 Image-feeding unit, scanner or camera
4 Protection providing unit
5 Secret image
6 Seed., initialization value
7 Scrambled secret image
8 Password phrase
8' Text-feeding unit
9 Scrambled seed
10 Digital passport picture plus scrambled secret image
11 Image-readout unit
12 Protected document bearing a passport picture
13 Image pixels
14 Pseudo-random number generator
15 Scrambled secret image
16 Parquet cell
17 Binary image from the parquet cells valued with 0 or 1
18 Image interference
19 Passport picture with image interference,
20 Document bearing a protected passport picture
20b Picture section extracting unit
20d Digitized image file of the document
21 Image-feeding unit, hand scanner
22 Text feeding unit
23 Image-readout unit, e.g. a simple LCD display
24 Visual comparison of P1 . . . PN pseudo-random numbers

What is claimed is:

1. A method for counterfeit-proofing of a document bearing a picture comprising the steps:

providing a digital image file of the picture having a first resolution of a number of pixels;

incorporating a secret image in a binary form having a second resolution of a number of pixels with the second resolution being less than the first resolution into the digital image so that the picture is divided into cells of a number equaling a number of pixels of the secret image;

forming a parameter function which allocates an output value of a zero or a one to each cell dependent upon at least one parameter value describing each pixel of a cell so that output values of all of the cells yield a position matrix containing a one or a zero at each point in the matrix;

modifying the parameter values of the pixels of the individual cells of the position matrix so that changes made to the digital image file result in no visually perceivable changes to the picture and the application of the parameter function to the individual cells yields a modified position matrix with each point in the modified position matrix containing a one or a zero which corresponds to a one or zero value of the pixels of the secret image; and associating the picture containing the modified position matrix with the document.

2. A method according to claim 1, wherein:
the picture is converted into the digital file by a scanner.

3. A method according to claim 1, wherein:
the cells of the modified position matrix have less resolution than the pixels of the picture.

4. A method according to claim 1, wherein:
the modification of the parameters utilizes an algorithm.

5. A method according to claim 1, wherein:
the parameter values represent at least one color, gray or saturation values of each pixel.

6. A method according to claim 1, wherein:
the forming of the parameter function depends on a probability of whether a pixel in a cell is surrounded by pixels having a frequency of occurrence of being either a one or a zero exceeding a frequency limit of occurrence.

7. A method according to claim 1, wherein three measurement functions are formed for conducting modification of parameter values comprising:
a first measurement function serving to determine a degree of modification of the visual quality of the picture;
a second measurement function serving to determine a matching of a result of the modified position matrix and the secret image; and
a third measurement function determining a robustness to change modification of the secret image.

8. A method according to claim 7, wherein:
the modification is conducted so that the first measurement function is a value as small as possible, the third measurement function is a value as great as possible, and the second measurement function is a value allocated for a perfect match.

9. A method according to claim 1, wherein:
the secret image comprises multiple pixels with individual pixels being determined by means of a sequence of pseudo-random numbers formed by a pseudo-random number generator according to an initialization value and parameter values of the pixels are exchanged in such a manner that the secret image is encoded.

10. A method according to claim 9, wherein:
the initialization value is encoded in a form of a password phrase.

11. A method for inspecting documents for authenticity of documents processed according to the process of claim 9, comprising:
detecting the secret image by means of an unit using the parameter function while inspecting for authenticity.

12. A method according to claim 11, wherein:
the inspection unit detects a section of the document containing the image.

13. A method according to claim 11, wherein:
the secret image is decoded using an initialization value and is displayed on a display device.

14. A method according to claim 2, wherein three measurement functions are formed for conducting modification of parameter values comprising:
a first measurement function serving to determine a degree of modification of the visual quality of the picture;
a second measurement function serving to determine a matching of a result of the modified position matrix and the secret image; and
a third measurement function determining a robustness to change modification of the secret image.

15. A method according to claim 3, wherein three measurement functions are formed for conducting modification of parameter values comprising:
a first measurement function serving to determine a degree of modification of the visual quality of the picture;
a second measurement function serving to determine a matching of a result of the modified position matrix and the secret image; and
a third measurement function determining a robustness to change modification of the secret image.

16. A method according to claim 4, wherein three measurement functions are formed for conducting modification of parameter values comprising:
a first measurement function serving to determine a degree of modification of the visual quality of the picture;
a second measurement function serving to determine a matching of a result of the modified position matrix and the secret image; and
a third measurement function determining a robustness to change modification of the secret image.

17. A method according to claim 5, wherein three measurement functions are formed for conducting modification of parameter values comprising:
a first measurement function serving to determine a degree of modification of the visual quality of the picture;
a second measurement function serving to determine a matching of a result of the modified position matrix and the secret image; and
a third measurement function determining a robustness to change modification of the secret image.

18. A method according to claim 6, wherein three measurement functions are formed for conducting modification of parameter values comprising:
a first measurement function serving to determine a degree of modification of the visual quality of the picture;
a second measurement function serving to determine a matching of a result of the modified position matrix and the secret image; and
a third measurement function determining a robustness to change modification of the secret image.

19. A method according to claim 2, wherein:
the secret image comprises multiple pixels with individual pixels being determined by means of a sequence of pseudo-random numbers formed by a pseudo-random number generator according to an initialization value and parameter values of the pixels are exchanged in such a manner that the secret image is encoded.

20. A method according to claim 6, wherein:
the secret image comprises multiple pixels with individual pixels being determined by means of a sequence of pseudo-random numbers formed by a pseudo-random number generator according to an initialization value and parameter values of the pixels are exchanged in such a manner that the secret image is encoded.

* * * * *